US008326323B2

(12) United States Patent (10) Patent No.: US 8,326,323 B2
Cibula et al. (45) Date of Patent: Dec. 4, 2012

(54) METHOD FOR MONITORING AND IDENTIFYING RADIO COVERAGE GAPS OF A PUBLIC LAND MOBILE NETWORK

(75) Inventors: Ondrej Cibula, Liptovsky Mikuláš (SK); Alexandr Johan, Praha (CZ); Jiri Stejskal, Smirice (CZ)

(73) Assignee: Deutsche Telekom AG, Bonn (DE)

( * ) Notice: Subject to any disclaimer, the term of this patent is extended or adjusted under 35 U.S.C. 154(b) by 115 days.

(21) Appl. No.: 12/677,868

(22) PCT Filed: Jun. 12, 2008

(86) PCT No.: PCT/EP2008/004725
§ 371 (c)(1),
(2), (4) Date: Mar. 12, 2010

(87) PCT Pub. No.: WO2009/033512
PCT Pub. Date: Mar. 19, 2009

(65) Prior Publication Data
US 2010/0304718 A1 Dec. 2, 2010

(30) Foreign Application Priority Data
Sep. 13, 2007 (EP) .................................. 07017962

(51) Int. Cl.
*H04W 24/00* (2009.01)
(52) U.S. Cl. ..................................... 455/456.1; 455/423
(58) Field of Classification Search .................. 455/423, 455/433, 446, 452.1, 456.1
See application file for complete search history.

(56) References Cited

U.S. PATENT DOCUMENTS

| 7,072,651 B2 * | 7/2006 | Jiang et al. ................. 455/432.1 |
| 2005/0054339 A1 | 3/2005 | Merritt |
| 2005/0282538 A1* | 12/2005 | Balon et al. .................... 455/423 |
| 2010/0136982 A1* | 6/2010 | Zabawskyj et al. ........... 455/445 |

FOREIGN PATENT DOCUMENTS

| EP | 1189473 | 3/2002 |
| EP | 1601218 | 11/2005 |

* cited by examiner

*Primary Examiner* — Ajit Patel
*Assistant Examiner* — Myron K Wyche
(74) *Attorney, Agent, or Firm* — Law Offices of Robert F. Zielinski, LLC

(57) ABSTRACT

Method for monitoring and identifying radio coverage gaps of a public land mobile network (PLMN) comprising usage of stand alone signaling transfer points (SASTP) producing list of cells, the method comprising the capturing of an update location (UL) message in the case of logging in a mobile communication device into the network and a cancel location (CL) message in the case of leaving the network, whereas the update location (UL) message and the cancel location (CL) message comprise an information identifying the mobile communication device, particularly the international mobile subscriber indentity number (IMSI), comprising generation of provide subscriber info message, whereas the provide subscriber info response (PSI_Resp) message from last visited VLR comprise a cell identification (Cell_ID) identifying the cell of the public land mobile network (PLMN) which was last used and/or in which the mobile communication device has left the network and further comprising the generation of a report message including the cell identification (Cell_ID).

10 Claims, 1 Drawing Sheet

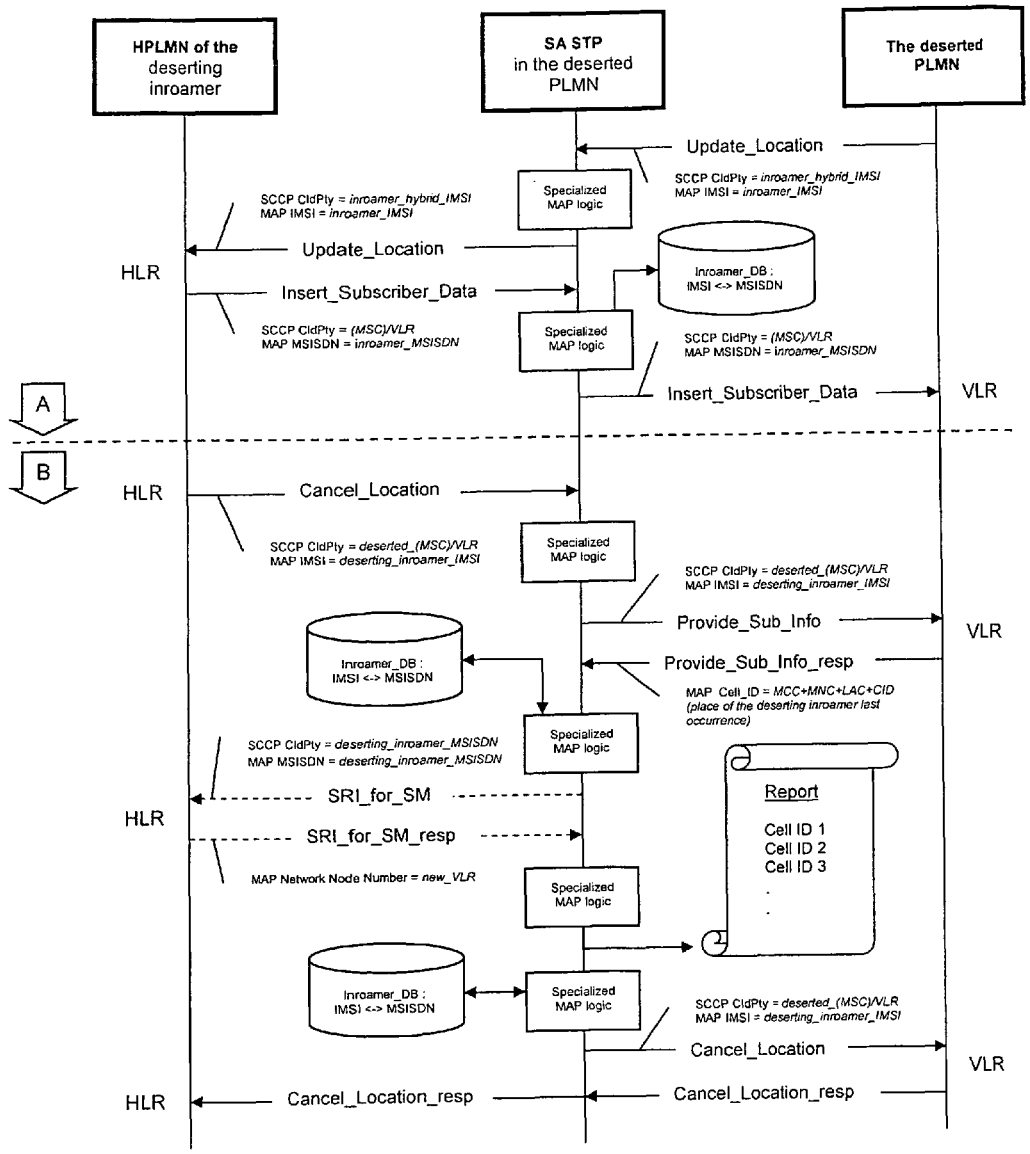

METHOD FOR MONITORING AND IDENTIFYING RADIO COVERAGE GAPS OF A PUBLIC LAND MOBILE NETWORK

CROSS-REFERENCE TO RELATED PATENT APPLICATIONS

The present application is a U.S. national stage application under 35 U.S.C. §371 of PCT Application No. PCT/EP2008/004725, filed Jun. 12, 2008, which in turn claims the priority benefit of European Patent Application No. 07017962.7, filed Sep. 13, 2007, the entireties of which are incorporated herein by reference.

The invention relates to a Method for monitoring and identifying radio coverage gaps of a public land mobile network (PLMN) comprising usage of stand alone signaling transfer points (SASTP) producing list of cells, the method comprising the capturing of an update location (UL) message in the case of logging in a mobile communication device into the network and a cancel location (CL) message in the case of leaving the network, whereas the update location (UL) message and the cancel location (CL) message comprise an information identifying the mobile communication device, particularly the international mobile subscriber indentity number (IMSI).

Stand alone signaling transfer points (SA STP) usually serves in a public land mobile network (PLMN) like a central communication node equipped with the sophisticated logics given for the signaling traffic relay, routing, protocol conversions and other kinds of signaling traffic manipulations (e.g. screening, subscription determination, etc.).

Such a central signaling switch usually serves at the same time as a signaling gateway from and to other national and/or international telephony and data networks. Instead of on stand alone signaling transfer points (SA STP) this logic can be deployed on a specialized signaling router provided the network is configured so as all the relevant signaling traffic is relayed via this specialized signaling router.

Usually, after the subscriber (i.e. inroamer in this case) has already registered at first time in the foreign network (i.e. deserted network in this case), the mobile equipment (mobile communication device) is still measuring the quality of the radio signal received from BTSs. As soon as the mobile equipment evaluates the radio conditions as unacceptable it searches and if it finds then registers in the network (another national mobile network, i.e. another public land mobile network) that provides better radio signal conditions in the considered geographical locality.

The object of the invention is to provide the information saying where its radio access network most probably has the radio signal problems that cause the loss of inroaming subscribers and so also the loss of revenue connected with the traffic produced by these subscribers.

This object is achieved according to the invention by a method with the characteristics mentioned in claim 1.

Because there is a cell identification extracted from a provide subscriber info response (PSI_Resp) message from the node of the public land mobile network which was last used and/or in which the mobile communication device left the network, the method can detect the geographic areas, where a sudden loss (or desertion) of foreign inroamers happened, and can subsequently indicate it to the network administrator by creating a problem report with list of these cells. Based on such a problem report the mobile operator can take the appropriate measures to improve the radio network coverage in order to prevent (or minimize at least) the mentioned negative phenomenon of inroamer desertion to other national mobile networks in the future.

It is advantageously that the invention can be implemented on existing standardized mobile application part (MAP) procedures and that it requires the minimal existing technology and communication protocols adjustments. Therefore the low implementation effort is one of the strengths of this solution.

The radio coverage gaps detection method (RCGDM) provides the mobile network operator with the possibility to increase its revenues. This revenue would come from the foreign customers (i.e. inroamers) that would not change the network (i.e. did not desert to another national network) due to the total loss or bad radio signal quality of the said network.

Additionally, by the proper RCGDM application, it protects the mobile network image as the radio signal is perfectly tuned in the critical localities and so there are no reasons for inroamers to spread a rumour about a bad radio signal quality of the said network.

Preferred embodiments of the invention result from the characteristics mentioned in the dependent claims.

Preferably the cell is classified as to be a border cell or an inland cell before generating the report message.

Preferably the identifying information about the mobile communication device, particularly the international mobile subscriber indentity number (IMSI), is extracted and stored, particularly temporary stored.

Preferably the update location (UL) message is generated by and/or received from a visitor location register (VLR).

Preferably the update location (UL) message is forwarded to a home location register (HLR).

Preferably the cancel location (CL) message is generated by and/or received from a home location register (HLR).

Preferably a message including a mobile subscriber ISDN number (MSISDN) is generated by and/or received from a home location register (HLR), particularly after forwarding the update location (UL) message to the home location register (HLR).

Preferably the identifying information about the mobile communication device, particularly the international mobile subscriber indentity number (IMSI), and a mobile subscriber ISDN number (MSISDN) of the mobile communication device is stored in a database, particularly temporary stored.

Preferably the cancel location (CL) message is forwarded to a visitor location register (VLR).

Preferably the visitor location register (VLR) generates a cancel location message response (CL_resp) including the cell identification (Cell_ID).

Preferably a new visitor location register (new_VLR) message is generated by and/or received from a home location register (HLR) identifying the mobile communication device and that a cell classification as to be a border cell or an inland cell is carried out before generating the report message.

The following assumptions are helpful for realising of the invention but not even necessary:

Stand alone signaling transfer points (SA STP) (typically a pair) serves as the transfer and/or the relay point for at least all the relevant PLMN internal signaling traffic as well as for all the relevant signaling traffic flowing to/from other national and international networks.
  Stand alone signaling transfer points (SA STP) is equipped with the db store & look-up technique (regardless the db is physically collocated or not) that allows to store and retrieve the MSISDN <-> IMSI relation pairs. Each one such a pair defines the particular inroaming customer (i.e. inroamer).

The mobile subscribers in the considered foreign country can do the foreign roaming at least in one other mobile network except to the mobile network that is considered as deserted network in this document.

The invention is explained in greater detail in the following by means of exemplary embodiments with reference to the associated drawing, in which:

FIG. 1 shows a general block diagram of the signal/message processing paths

FIG. 1 shows a general block diagram of the signal/message processing paths of a method for monitoring and identifying radio coverage gaps of a public land mobile network (PLMN).

Upon receiving the Update_Location (UL) message from a Visitor Location Register (VLR), the Signaling Connection Control Part (SCCP) layer in stand alone signaling transfer points (SA STP) forwards it, based on origin, destination, subsystem identifier and application context, to the local Mobile Application Part (MAP) layer. Here the specialized software logic extracts the IMSI number and remembers it temporary together with the information to what transaction this IMSI belongs. IMSI number determines here the foreign subscriber (i.e. inroamer) that initiated the Update_Location (UL) procedure in the area served by the sending Visitor Location Register (VLR). Then the Update_Location (UL) message is normally forwarded towards the Home Location Register (HLR) placed in Home PLMN (Home Public Land Mobile Network) of the inroaming subscriber.

The Home Location Register (HLR) responses with the message Insert_Subscriber_Data (ISD) that is in stand alone signaling transfer points (SA STP) forwarded to the local Mobile Application Part (MAP) layer too. Here the specialized software logic correlate this message with the previous Update_Location (UL) message, extracts the MSISDN number that belongs to the same subscriber and forwards the unchanged Insert_Subscriber_Data (ISD) message normally to the Visitor Location Register (VLR). Additionally the obtained IMSI <-> MSISDN number pair, that identifies the inroamimg subscriber, is stored in a database. The rest of the Update Location procedure is not interesting here for the purpose of this invention and so is omitted.

After the inroamer has left the considered network, the Cancel_Location (CL) message is sent from the deserting inroamer's Home Location Register (HLR) towards the Visitor Location Register (VLR) of the considered (=deserted) network. Capturing of the Cancel_Location (CL) message starts the active part (part "B" in the scheme) of the Radio Coverage Gaps Detection Method (RCGDM) on the stand alone signaling transfer points (SA STP). The specialized Mobile Application Part (MAP) logic extracts the IMSI number of the deserting subscriber from the Cancel_Location message and defers the Cancel_Location (CL) message temporary on stand alone signaling transfer points (SA STP).

Immediately after that it composes the Provide_Subscriber_Info (PSI) message using the IMSI number obtained from Cancel_Location message and sends it towards the old Visitor Location Register (VLR) (instead of Cancel_Location message) using the Visitor Location Register (VLR) address obtained from Cancel_Location (CL) message too. The old Visitor Location Register (VLR) responses back with the message Provide_Subscriber_Info_Resp (PSI_Resp) containing the Cell_ID that identifies the last occurrence place of the deserting inroamer within the deserted network.

The Cell_ID information received within the Provide_Subscriber_Info_Resp (PSI_Resp) is sufficient, together with other obtained information, to compose the problem report that can indicate where are the places in radio network that potentially needs to be checked and improved. Since many cells are naturally last occurrence places of the inroaming subscribers within the network (border cell), i.e. cells covering country border or airports etc in opposition to an inland cell, the more accurate selection can further be performed on stand alone signaling transfer points (SA STP) before the final problem report is produced.

This can be done using the MSISDN <-> IMSI information got within the "A" part of the whole mechanism (FIG. 1). Now the specialized Mobile Application Part (MAP) logic has to retrieve from the mentioned database the MSISDN number belonging to the IMSI number that was contained in the Cancel_Location (CL) message. Please note that the Cancel_Location (CL) message is still kept in "on hold" status on stand alone signaling transfer points (SA STP). Stand alone signaling transfer points (SA STP) then composes the Send_Routing_Info_for_SM using the MSISDN retrieved from the IMSI <-> MSISDN database and sends it towards the inroamer Home Locator Register (HLR). It responses with the new (=current) Visitor Location Register (VLR) location of the subscriber (former inroamer) that deserted to another network.

Based on the new (=current) Visitor Location Register (new_VLR) address the stand alone signaling transfer points (SA STP) forms the final problem report. If the new Visitor Location Register (VLR) address does not belong to any national mobile network operated in the same country as the deserted network, it is the normal case that is of no interest from the purpose of Radio Coverage Gaps Detection Method (RCGDM) point of view and so the cells related to this case are not considered in further processing. But if on the other hand the new Visitor Location Register (VLR) address belongs to one of the competitive national mobile networks then the probability of radio access network problem is significantly increased and so the related cells are inserted into the output list of the problem report.

After the new record is written into the output report, the stand alone signaling transfer points (SA STP) deletes the related records from "Inroamer_DB".

Finally stand alone signaling transfer points (SA STP) can forward the Cancel_Location (CL) message (delayed up to now) towards the old Visitor Location Register (VLR) that wipes the subscriber record from its database and sends the confirmation back to the Home Locator Register (HLR).

Additionally, the same mechanism could be used for monitoring of a foreign partner radio network coverage quality. The only principal difference is that in this case the procedure applies to Update_Location (UL) procedure generated by the own outroamer (i.e. own subscriber which originally is/was in foreign roaming in a partner network) when changing from partner (i.e. preferred) network to another mobile network that operates in that country.

ABBREVIATIONS

PLMN: Public Land Mobile Network
HPLMN: Home PLMN
RCGDM: Radio Coverage Gaps Detection Method
db or DB: Database
GW: Gateway
BTS: Base Transceiver Station
ME: Mobile Equipment
UL: Update Location
ISD: Insert Subscriber Data
CL: Cancel Location
PSI: Provide Subscriber Info
PSI_Resp: Provide Subscriber Info Response IMSI: International Mobile Subscriber Identity number
MSISDN: Mobile Subscriber ISDN number
STP: Signaling Transfer Point
SA STP: Stand Alone Signaling Transfer Point
SMS: Short Message Service
SMSC: Short Message Service Centre
SCCP: Signaling Connection Control Part
MNP: Mobile Number Portability
MAP: Mobile Application Part
MO SMS: Mobile Originating SMS
MT SMS: Mobile Terminating SMS
MSC: Mobile Switching Centre
VMSC: Visited MSC
HLR: Home Location Register
VLR: Visitor Location Register
ClgPty: Calling Party
CldPty: Called Party

The invention claimed is:

1. A method for monitoring and identifying radio coverage gaps of a public land mobile network (PLMN) comprising usage of stand alone signaling transfer points (SASTP) producing list of cells, the method comprising:

capturing an update location (UL) message, in the case of logging in a mobile communication device into the network, and a cancel location (CL) message, in the case of leaving the network, wherein the update location (UL) message and the cancel location (CL) message comprise an information identifying the mobile communication device, including the international mobile subscriber identity number (IMSI) comprising generation of provided subscriber info (PSI) message, the capturing of the cancel location (CL) message starts the radio coverage gaps method (RCGDM), on the stand-alone signaling transfer points (SASTP), wherein a specialized Mobile Application Part (MAP) logic extracts the IMSI number of the mobile communication device leaving the network from the cancel location message (CL) and defers the cancel location (CL) message temporarily on stand alone signaling transfer points (SASTP), and that the stand alone signaling transfer points (SASTP) composes the provided subscriber info (PSI) message using the IMSI number obtained from the cancel location message (CL) and sends it to the Visitor Location Register (VLR) of the public land mobile network using the Visitor Location Register (VLR) address obtained from the cancel location (CL) message, wherein the provide subscriber info response (PSI_Resp) message from last visited Visitor Location Register (VLR) comprises a cell identification (Cell_ID) identifying the cell of the public land mobile network (PLMN) which was last used and/or in which the mobile communication device has left the network and further comprising the generation of a report message including the cell identification (Cell_ID), wherein the cell is classified as a border cell or an inland cell before generating the report message.

2. The method according to claim 1, wherein the identifying information about the mobile communication device, international mobile subscriber identity number (IMSI), is extracted and stored, or temporarily stored.

3. The method according to claim 2, wherein the update location (UL) message is captured by and/or received from a visitor location register (VLR).

4. The method according to claim 3, wherein the update location (UL) message is forwarded to a home location register (HLR).

5. The method according to claim 3, wherein the cancel location (CL) message is captured by and/or received from a home location register (HLR).

6. The method according to claim 3, wherein a message including a mobile subscriber ISDN number (MSISDN) is generated by and/or received from a home location register (HLR), particularly after forwarding the update location (UL) message to the home location register (HLR).

7. The method according to claim 3, wherein the identifying information about the mobile communication device, particularly the international mobile subscriber indentity number (IMSI) and a mobile subscriber ISDN number (MSISDN) of the mobile communication device is stored in a database, or temporary stored.

8. The method according to claim 3, wherein the cancel location (CL) message is forwarded to a visitor location register (VLR).

9. The method according to claim 3, wherein the visitor location register (VLR) generates a provide subscriber info response message including the cell identification (Cell_ID).

10. The method according to claim 6, wherein a message including a mobile subscriber ISDN number (MSISDN) is generated by and/or received from a home location register (HLR), after forwarding the update location (UL) message to the home location register (HLR).

* * * * *